United States Patent
Balakrishnan et al.

(10) Patent No.: US 9,164,681 B1
(45) Date of Patent: Oct. 20, 2015

(54) METHOD AND APPARATUS FOR DYNAMIC PATH-SELECTION FOR IMPROVING I/O PERFORMANCE IN VIRTUAL PROVISIONED STORAGE ARRAYS WITH DATA STRIPING

(71) Applicant: EMC Corporation, Hopkinton, MA (US)

(72) Inventors: Ajith Balakrishnan, Bangalore (IN); Zvi Gabriel Benhanokh, Tel Aviv (IL); Arieh Don, Newton, MA (US); Eitan Ben-Amos, Karkur (IL)

(73) Assignee: EMC CORPORATION, Hopkinton, MA (US)

( * ) Notice: Subject to any disclaimer, the term of this patent is extended or adjusted under 35 U.S.C. 154(b) by 0 days.

(21) Appl. No.: 14/231,151

(22) Filed: Mar. 31, 2014

(51) Int. Cl.
G06F 13/38 (2006.01)
G06F 3/06 (2006.01)

(52) U.S. Cl.
CPC ............ *G06F 3/0611* (2013.01); *G06F 3/0638* (2013.01); *G06F 3/0689* (2013.01)

(58) Field of Classification Search
None
See application file for complete search history.

(56) References Cited

U.S. PATENT DOCUMENTS

2003/0182504 A1* 9/2003 Nielsen et al. ................ 711/114
2005/0204106 A1* 9/2005 Testardi ........................ 711/162

* cited by examiner

*Primary Examiner* — Scott Sun
(74) *Attorney, Agent, or Firm* — Krishnendu Gupta; Gerald P. Kazanjian

(57) ABSTRACT

Example embodiments of the present invention relate to a method, an apparatus, and a computer program product for sending an I/O over a preferred path. The method includes determining a preferred path to an address range of a virtual storage unit striped across a plurality of disks of a data storage system and sending an I/O for data comprising the address range over the preferred path.

21 Claims, 12 Drawing Sheets

(MAPPING)

(READ I/O – ACCURATE MAPPING)

(STRIPING CHANGES – MAPPING NOW STALE)

(READ I/O – STALE MAPPING)

(REMAPPING)

(READ I/O – NEW ACCURATE MAPPING)

METHOD AND APPARATUS FOR DYNAMIC PATH-SELECTION FOR IMPROVING I/O PERFORMANCE IN VIRTUAL PROVISIONED STORAGE ARRAYS WITH DATA STRIPING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage.

BACKGROUND

In modern computer systems, vast amounts of data may need to be accessed by hundreds, thousands or even million of different entities, including persons and groups (e.g., organizations) of persons. Accordingly, computer systems have been developed in which data is stored on multiple physical storage units (PSUs), i.e., physical storage devices including, but not limited to magnetic tape, disk drives, solid state storage devices (e.g., flash drives) or portions thereof. Typically, these physical storage devices are grouped together as part of one or more data storage systems (e.g., storage arrays), for example, data storage systems made available by EMC Corporation, headquartered in Hopkinton Mass. ("EMC").

Entities typically access the data on such data storage systems via one or more host systems for which communication paths have been established over one or more communication media (e.g., as part of a network) between ports of the host systems and ports of the data storage systems. Through the host systems, data of the data storage system may be accessed and modified using I/O operations, for example, read and write operations. To this end, data storage systems may provide storage services to host systems. Data storage systems may include PSUs, which typically are nonvolatile memory on which data is persisted even if power is lost, and cache memory (i.e., caches), which typically is volatile memory in which data is temporarily stored for efficiency purposes. Typically, data can be read from, and written to, cache faster than it can be from the non-volatile PSUs. Data storage systems typically include front-end logic and functional components to handle the exchange of data between data storage system ports and cache, and back-end logic and functional components to handle data exchanges between the cache and the PSUs.

Host systems typically do not address the PSUs of the data storage system directly, but rather, access the PSUs by addressing virtual (i.e., logical) storage units (VSUs), for example, logical volumes (LVs), thin devices and storage groups, which hide the details of actual physical storage from the host. A VSU may or may not correspond one-to-one to a PSU.

As data storage capacity, computation and flexibility demands continue to grow at a rapid rate, so does the challenge of maintaining acceptable levels of data storage system performance.

SUMMARY

Example embodiments of the present invention relate to a method, an apparatus, and a computer program product for sending an I/O over a preferred path. The method includes determining a preferred path to an address range of a virtual storage unit striped across a plurality of disks of a data storage system and sending an I/O for data comprising the address range over the preferred path.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
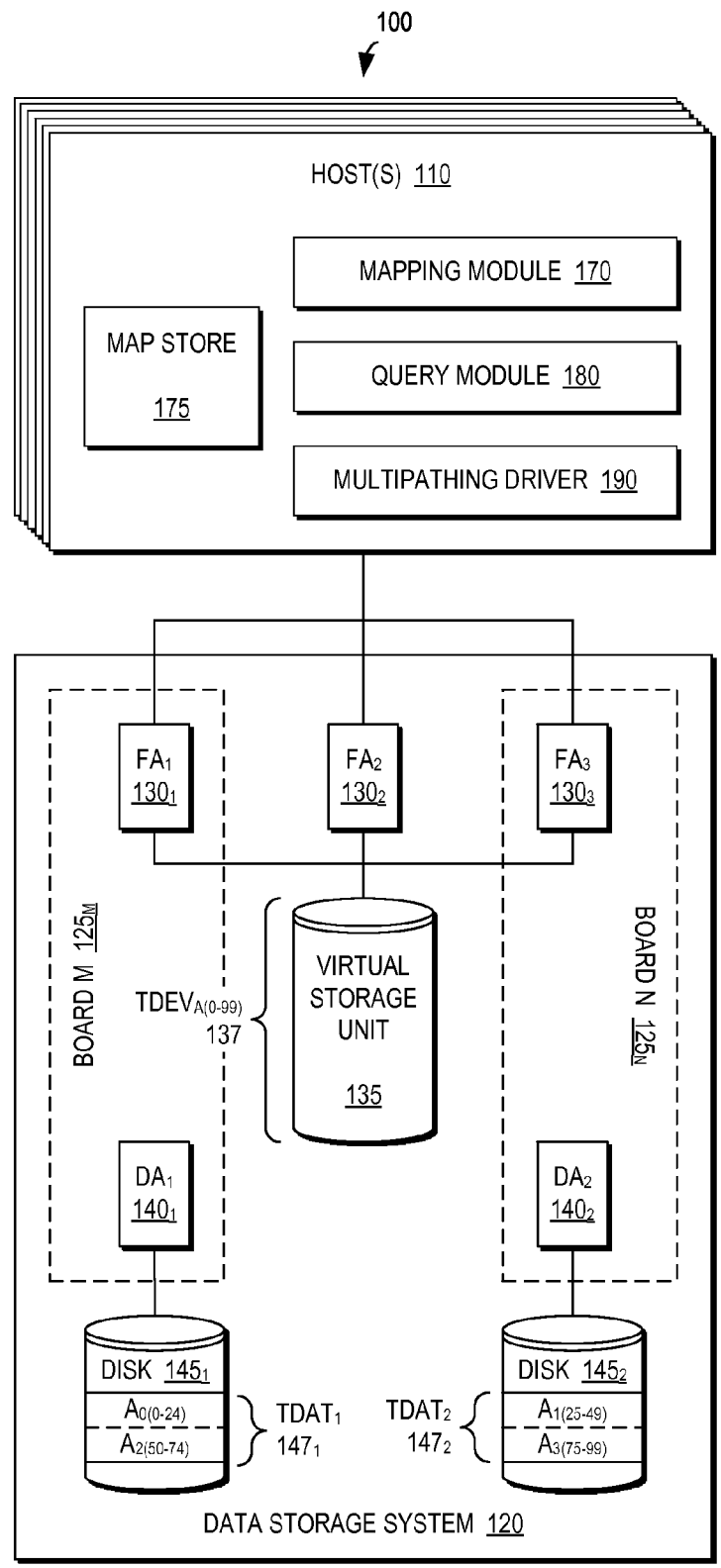
FIG. 1 is a block diagram of a system, including a plurality of hosts, each including a mapping module, a map store, a query module, and a host bus adapter (HBA), and a data storage system, according to an example embodiment of the present invention.

FIG. 1 is a block diagram of a system 100, including a plurality of hosts 110, each including a mapping module 170, a map store 175, a query module 180, and a multipathing driver 190, and a data storage system 120, according to an example embodiment of the present invention. The data storage system 120 may include a plurality of front-end adapters (FAs) $130_1$-$130_3$ (130 generally) that provide a host access to a virtual storage unit 135. The virtual storage unit 135 may be comprised of physical storage (i.e., disks $145_1$, $145_2$) access by the data storage system 120 over disk adapters (DAs) $140_k$, $140_2$ (140 generally).

In some instances, such as in data storage systems 120 including Symmetrix® arrays by EMC Corporation of Hopkinton, Mass., the back end DA 140 reading data off the disk 145 might be on the same board 125 as the FA 130 that received the I/O. In other words, the FAs 130 and DAs 140 may be on the same communications board (e.g., $FA_1$ $130_1$ and $DA_1$ $140_1$ on Board M $125_M$ and $FA_3$ $130_3$ and $DA_2$ $140_2$ on Board N $125_N$). Accessing a disk 145 via its DA 140 via an FA 130 on the same board as the DA 140 yields an increase performance, not just due to reducing communications between boards 125 (i.e., reducing communications latency because the FA 130 and the DA 140 are on the same board).

It should be understood that, in a preferred embodiment, and as will be described below in greater detail with respect to FIG. 5, each board 125 may comprise an FA 130, a DA 140, and memory (not shown) (e.g., a portion of memory 550 of FIG. 5). The memory on a board 125 may be configured to store tables regarding data available on the disk 145 interfaced by the board's DA 140. In other words, the tables for a disk 145 are local to its DA 140 (e.g., the memory for board M $125_M$ stores tables for disk $145_1$ interfaced by $DA_1$ $140_1$ and the memory for board N $125_N$ stores tables for disk $145_2$ interfaced by DA2 $140_2$). Further, the messaging described below with respect to FIG. 5 allows the collection of memory for the plurality of boards 125 to act as, and be visible to the FAs 130, a single global memory.

Therefore, it would be advantageous to direct an I/O from a host 110 to an FA 130 on the same board 125 as the DA 140 that will access the data from the disk 145 to reduce latency attributable to internal communications between boards 125. For example, if $FA_1$ $130_1$ needs data on Disk $145_1$, it is faster to get the data from $DA_1$ $140_1$ on the same board M $125_M$ as $FA_1$ $130_1$ than from $DA_2$ $140_2$ on a different board N $125_N$ as $FA_1$ $130_1$. It should be understood that in a multi-board (i.e., board M $125_M$ and board N $125_N$) storage array architecture, accessing two components on the same board uses local memory. In contrast, accessing data between boards (i.e., board M $125_M$ and board N $125_N$) may require inter-board messaging paths be employed by one or more of the FAs 130 and DAs 140.

As illustrated in FIG. 1, a virtual storage unit 135 (e.g., a SCSI device in a data storage system 120) might be striped across multiple spindles 145, such as for performance benefits. In this example embodiments, each of the data storage system FAs 130 is connected by a respective path to the host 110. The host may include a multipathing driving, such as PowerPath by EMC Corporation of Hopkinton, Mass. As understood in the art, multipathing drivers typically send commands to each available FA 130 in a round robin manner for load balancing.

The virtual storage unit 135 may comprise a SCSI device $TDEV_A$ 137 that is mapped to each of the FAs 130. Accordingly, the host 110 can access $TDEV_A$ through $FA_1$ $130_1$, $FA_2$ $130_2$, or $FA_3$ $130_3$ with $DA_1$ $140_1$ connected to Disk $145_1$ and $DA_2$ $140_2$ connected to Disk $145_2$. It may be up to the multipathing driver to determine which FA 130 is used to access the device.

The SCSI device $TDEV_A$ 137 may have an address range of 0-99. A portion of Disk $145_1$ may be described as a data device $TDAT_1$ $147_1$ and a portion of Disk $145_2$ may be $TDAT_2$ $147_2$ (147 generally), with the multiple TDATs 147 mapped to the one $TDEV_A$ 137. Therefore, the data of $TDEV_A$ 137 may be striped across the two TDATs 147. As illustrated in FIG. 1, $TDAT_1$ $147_1$ stores address ranges $A_0$ having an address range of 0-24 and $A_2$ having an address range of 50-74 and $TDAT_2$ $147_2$ stores address ranges $A_1$ having an address range of 25-49 and $A_3$ having an address range of 75-99.

Figure 2A:
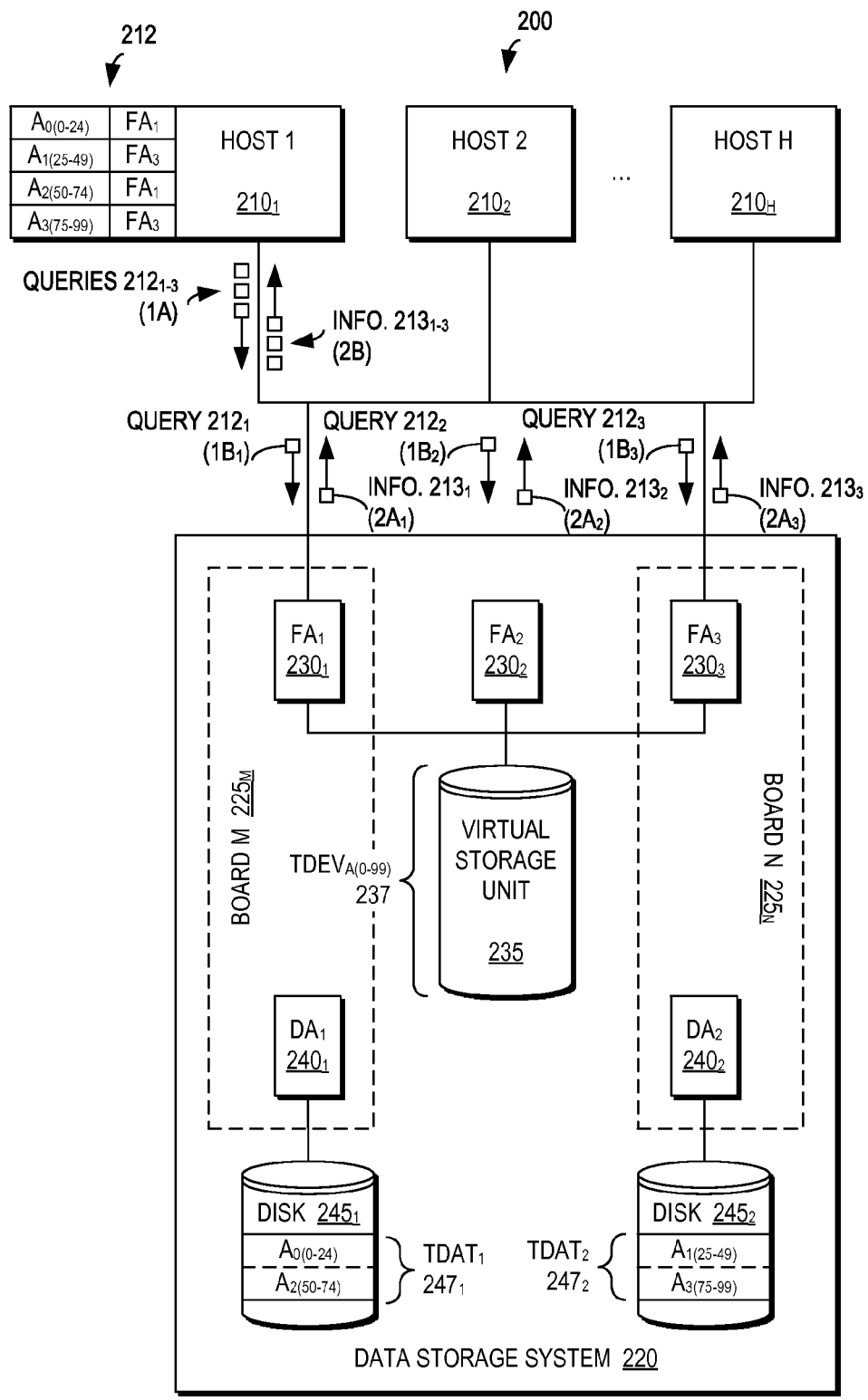
FIG. 2A is a block diagram of the system of FIG. 1 illustrating a data storage system having data striped across a plurality of disks and a host querying ports of a data storage system for address ranges of the striped data accessible over the ports to generate a mapping of address ranges available over respective ports according to an example embodiment of the present invention.

FIG. 2A is a block diagram of the system 200 of FIG. 1 illustrating a data storage system 220 having data (e.g., $TDEV_A$ 237) striped across a plurality of disks $245_1$, $245_2$ and a host $210_1$ querying ports (e.g., $FA_1$ $230_1$, $FA_2$ $230_2$, and $FA_3$ $230_3$ (230 generally)) of a data storage system 220 for address ranges (e.g., $A_0$, $A_1$, $A_2$, and $A_3$ (A generally)) of the striped data accessible over the ports 230 to generate a mapping 212 of address ranges A available over respective ports 230 according to an example embodiment of the present invention. FIG. 3 is a flow diagram of a method according to an example embodiment of the present invention. FIGS. 1-3 may be described in conjunction below.

As illustrated in FIGS. 2A and 3, the host 210 may determine a preferred path to an address range (e.g., $A_0$, $A_1$, $A_2$, and $A_3$) of a virtual storage unit 235 (i.e., $TDEV_A$ 237) striped (i.e., $A_0$ and $A_2$ of $TDAT_1$ $247_1$ and $A_1$ and $A_3$ of $TDAT_2$ $247_2$) across a plurality of disks (e.g., Disks $245_1$ and $245_2$) of a data storage system 220 and send an I/O for data comprising the desired address range over the preferred path.

In certain embodiments, the host 210 may determine a preferred path by querying the data storage system 220 for path and address range information (305). As illustrated in FIGS. 1 and 2A, the query module 180 of Host 1 $210_1$, for example, may (1A) send a plurality of queries $212_{1-3}$ (212 generally), with each query 212 being directed from the multipathing driver 190 to a respective FA 230 (e.g., ($1B_1$) query $212_1$ to $FA_1$ $230_1$, ($1B_2$) query $212_2$ to $FA_2$ $230_2$, and ($1B_3$) query $212_3$ to $FA_3$ $230_3$).

The host 210 then may receive the path and address range information $213_{1-3}$ (213 generally) from the data storage system 220 (310). As illustrated in FIGS. 1 and 2A, each FA 230 may respond to its respective query 212 with path and address range information 213 back to the host $210_1$ (e.g., ($2A_1$) $FA_1$ $230_1$ may respond with information $213_1$, ($2A_2$) $FA_2$ $230_2$ may respond with information $213_2$, and ($2A_3$) $FA_3$ $230_3$ may respond with information $213_3$).

The host $210_1$ may (2B) receive the information $213_{1-3}$ over the multipathing driver 190 and a mapping module 170 may map the path and address range information (315) to determine the preferred path to the address range. The mapping module 170 may store the map 212 to a map store 175. In other words, according to the storage path and address range information 213 received by the host $210_1$, the mapping module 170 may assign respective address ranges of the virtual storage unit 235 to certain FAs 230 of the data storage system 220. As illustrated in FIG. 2A, host $210_1$ creates a map 212 assigning address range $A_{0(0-24)}$ to $FA_1$, address range $A_{1(25-49)}$ to $FA_3$, address range $A_{2(50-74)}$ to $FA_1$, and address range $A_{3(75-99)}$ to $FA_3$ according to the storage path and address range information 214 received from each FA 230.

In other words, based on the queries 212 from the host 210, the data storage system 220 educates the host 210 regarding which address ranges are served by FAs 230 on the same board 225 as the DA 240 accessing the disk 245. In certain embodiments, the queries 212 may be SCSI commands. In certain embodiments, the host 210 may send a single query 212 to the data storage system 220 and the data storage system 220 may respond with the storage path and address range information 213 for all FAs 230.

Figure 2B:
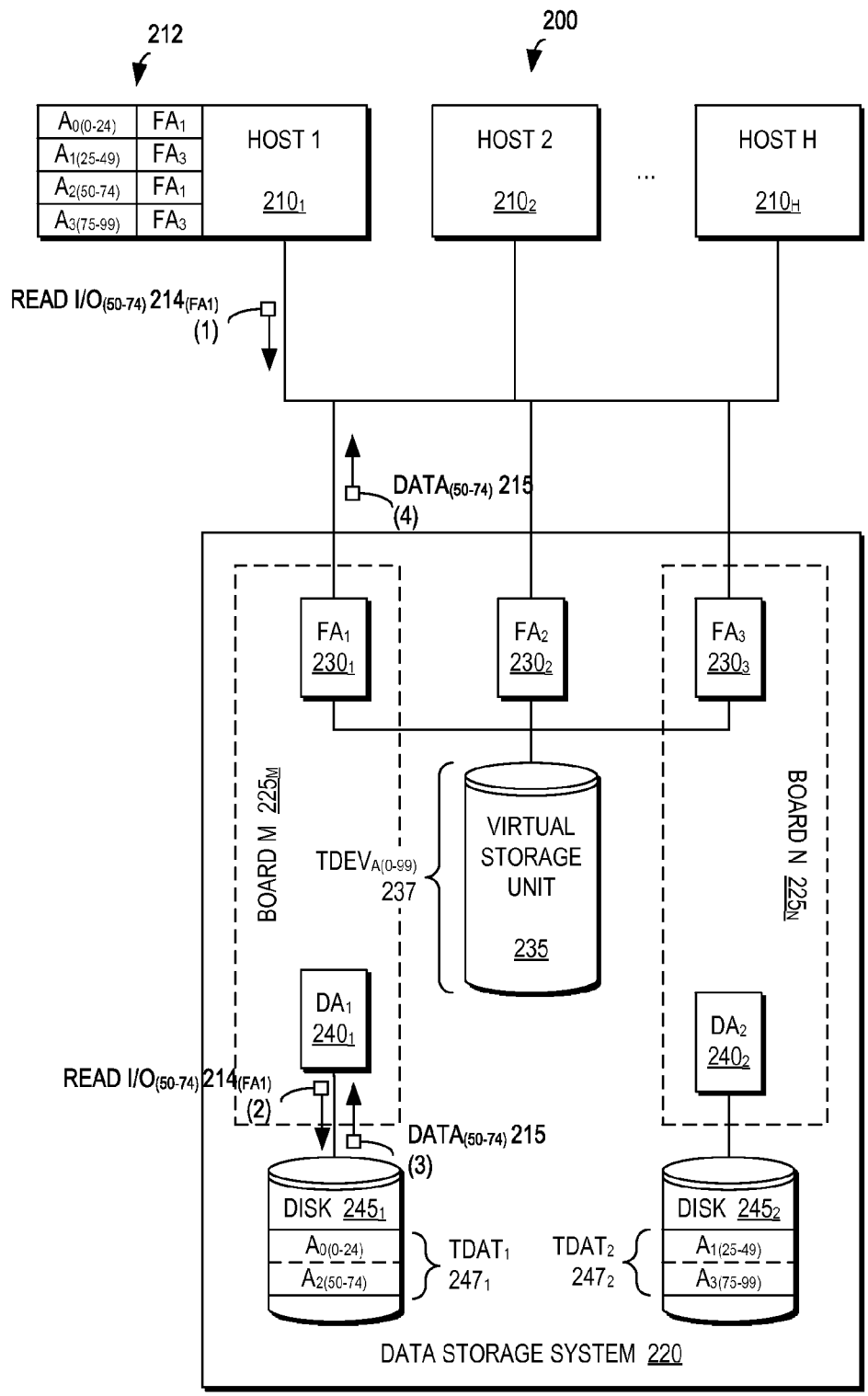
FIG. 2B is a block diagram of the system of FIG. 1 illustrating a host sending a read I/O to a port of a data storage system according to a mapping of address ranges available over respective ports and data returned by the data storage system to the host according to an example embodiment of the present invention.
Figure 3:
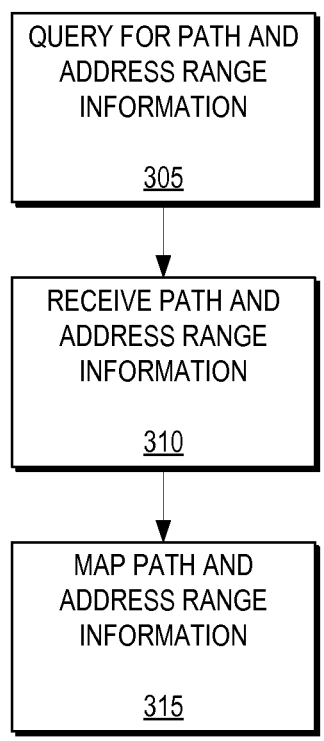
FIG. 3 is a flow diagram of a method according to an example embodiment of the present invention.

FIG. 2B is a block diagram of the system 200 of FIG. 1 illustrating a host $210_1$ sending a read I/O 214 to a port (e.g., $FA_1$ $230_1$) of a data storage system 220 according to a mapping 212 of address ranges (e.g., $A_0, A_1, A_2$, and $A_3$) available over respective ports (e.g., $FA_1$ $230_1$ and $FA_3$ $230_3$) and data 215 returned by the data storage system 220 to the host $210_1$ according to an example embodiment of the present invention. As illustrated in FIG. 2B, the host $210_1$ may receive an I/O request from, for example, an application hosted by the host $210_1$ for data in address range $A_{2(50-74)}$. According to the map 212, the host $210_1$ determines that the preferred FA 230 of the data storage system 220 to access the requested data in address range $A_2$ is $FA_1$ $230_1$. Therefore, (1) the host $210_1$ directs the read I/O$_{(50-74)}$ $214_{(FA1)}$ to $FA_1$ $230_1$. The data storage system 220 receives the I/O 214 at $FA_1$ $230_1$ and $FA_1$ $230_1$ directs the I/O 214 to $DA_1$ $240_1$ on the same board M $225_M$ as $FA_1$ $230_1$. $DA_1$ $240_1$ then (2) serves the I/O 214 on disk $245_1$ and (3) receives data$_{(50-74)}$ 215 from disk $245_1$ in response to the I/O 214. $DA_1$ $240_1$ directs the data 215 to $FA_1$ $230_1$ on the same board M $225_M$ as $DA_1$ $240_1$. The data storage system 220 then (4) returns the data 215 requested by the I/O 214 from $FA_1$ $230_1$ to the host $210_1$.

Figure 2C:
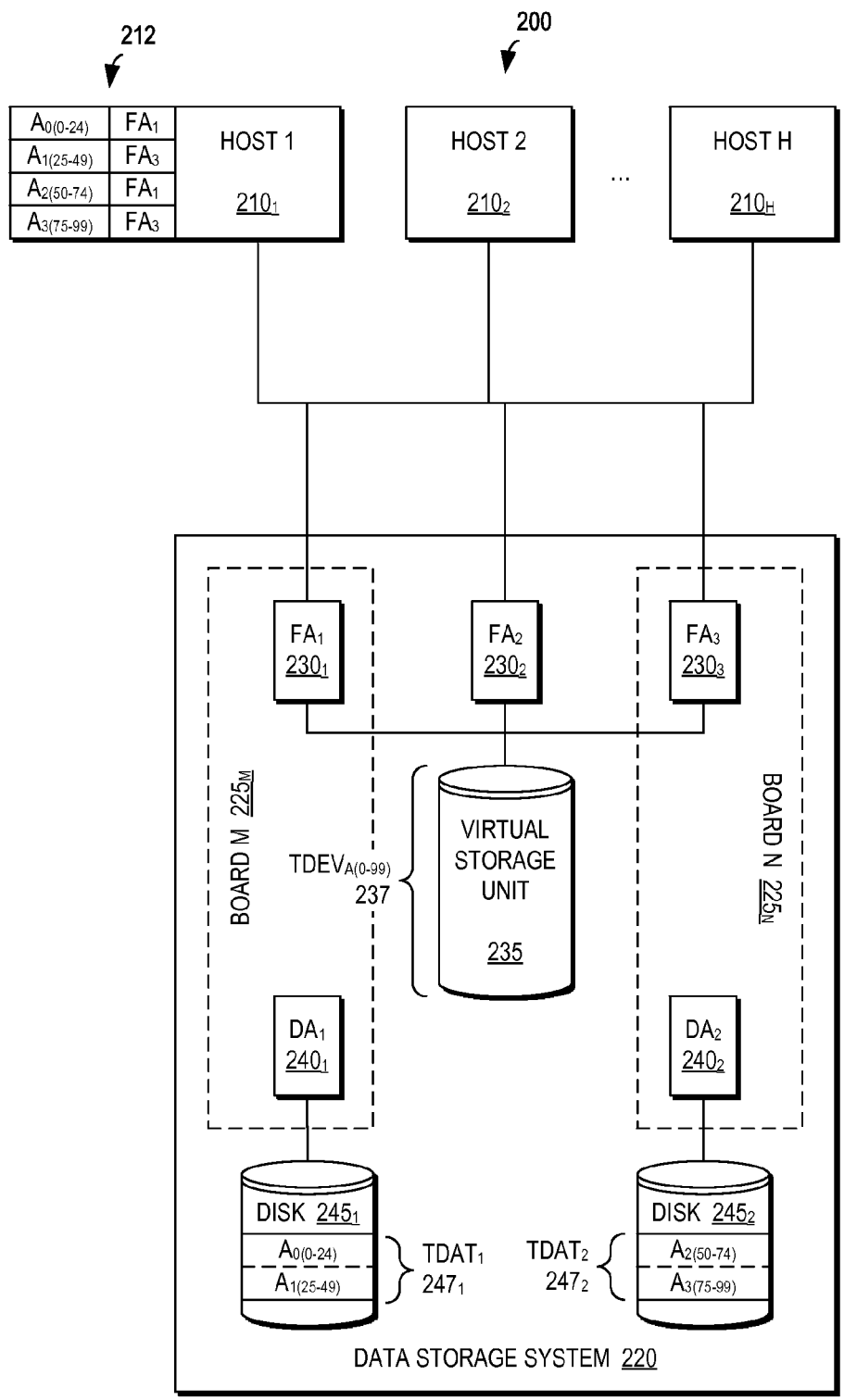
FIG. 2C is a block diagram of the system of FIG. 1 illustrating a changed striping of data across a plurality of disks thereby resulting in the mapping of address ranges available over respective ports at the host being stale according to an example embodiment of the present invention.

FIG. 2C is a block diagram of the system 200 of FIG. 1 illustrating a changed striping of data across a plurality of disks 245 thereby resulting in the mapping 212 of address ranges available over respective ports 230 at the host being stale according to an example embodiment of the present invention. As understood in the art, an address range may be moved between spindles (i.e., disks 245). For example, data may be tiered over a plurality of storage tiers using tiering technology, such as FAST by EMC Corporation of Hopkinton, Mass. In certain embodiments, the tiering may change one or two times per week, or more or less frequently.

As illustrated in FIG. 2C, the data of the virtual storage unit 235 (i.e., $TDEV_A$ 237) has been retiered over the disks 245, thereby causing address ranges $A_0$ and $A_1$ to now comprise $TDAT_1$ $247_1$ on disk $245_1$ and address ranges $A_2$ and $A_3$ to now comprise $TDAT_2$ $247_2$ on disk $245_2$. However, disk $245_1$ still remains served by $DA_1$ $240_1$ on the same board M $225_M$ as $FA_1$ $230_1$ and disk $245_2$ still remains served by $DA_2$ $240_2$ on the same board N $225_N$ as $FA_3$ $230_3$. Therefore, the mapping 212 at the host $210_1$ is stale as it still reflects the prior mapping as previously illustrated and described with respect to FIGS. 2A and 2B.

However, it should be understood that, while the simplified data storage system 220 of FIGS. 2A-2F only shows four address ranges, there may be hundreds of thousands of address ranges, or more. Accordingly, a significant amount of processing time would be required to perform a frequent remapping. This would create a high workload and burden across the host 210 and data storage system 220. Further, it should be understood that, typically, most address ranges do not change. Accordingly, in certain embodiments, each time the mapping of $TDEV_A$ 237 as stored as address ranges $A_0$-$A_3$ in $TDAT_1$ $247_1$ and $TDAT_2$ $247_2$, a counter on the data storage system 220 may be incremented. In certain embodiments, the host 210 may periodically poll the data storage system 220 for the counter and, if the counter has incremented since the hosts 210 previous poll, may send a command to the data storage system 220 to read the mapping (as illustrated in FIG. 2A). However, if the counter has not incremented since the previous poll, host 210 need not perform a remapping. In other embodiments, the host 210 may periodically perform a remapping, as illustrated in FIG. 2A, regardless of whether a counter of mapping changes is maintained by the data storage system 220. As described below with respect to FIG. 2D, I/Os still may be served to access data on disks despite the stale mapping.

Figure 2D:
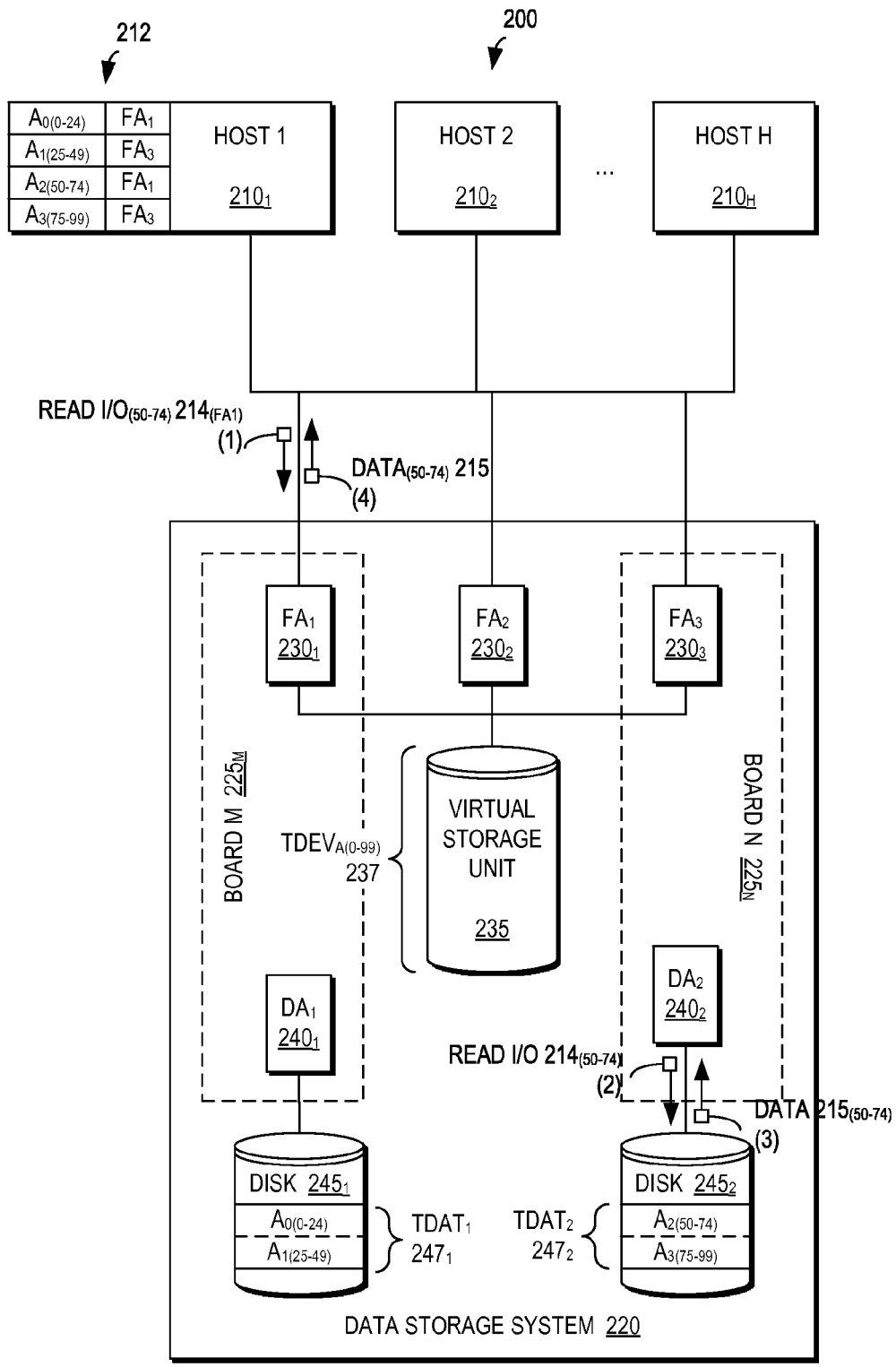
FIG. 2D is a block diagram of the system of FIG. 1 illustrating a host sending a read I/O to a port of a data storage system according to a stale mapping subsequent to a change in striping across a plurality of disks and data returned by the data storage system to the host despite the stale mapping according to an example embodiment of the present invention.

FIG. 2D is a block diagram of the system 200 of FIG. 1 illustrating a host 210 sending a read I/O 214 to a port $230_1$ of a data storage system 220 according to a stale mapping 212 subsequent to a change in striping of address ranges $A_0$-$A_3$ across a plurality of disks 245 and data 215 returned by the data storage system 220 to the host 210 despite the stale mapping 212 according to an example embodiment of the present invention. As illustrated in FIG. 2D, the host 201 still may access data stored on the data storage system 220 despite a stale mapping 212. The host $210_1$ may (1) send a read I/O 214 for address range $A_{2(50-74)}$ to $FA_1$ $230_1$ according to the stale mapping 212. $FA_1$ $230_1$ may receive the read I/O 214 and, as described below in greater detail with reference to FIGS. 4 and 5, may cause $DA_2$ $240_2$, which provides direct access to disk $245_2$ on which address range $A_{2(50-74)}$ is stored, to (2) serve the I/O 214 on disk $245_2$ to retrieve the data 215 of address range $A_{2(50-74)}$. $FA_1$ $230_1$ then may (4) return the data 215 to the host $210_1$. It should be noted, however, that although the data 215 is accessible from all FAs 230, accessing the data 215 over $FA_1$ $230_1$ rather than $FA_3$ $230_3$ produces decreased performance because of the internal messaging necessary to direct the I/O 214 to the proper DA 240.

Figure 2E:
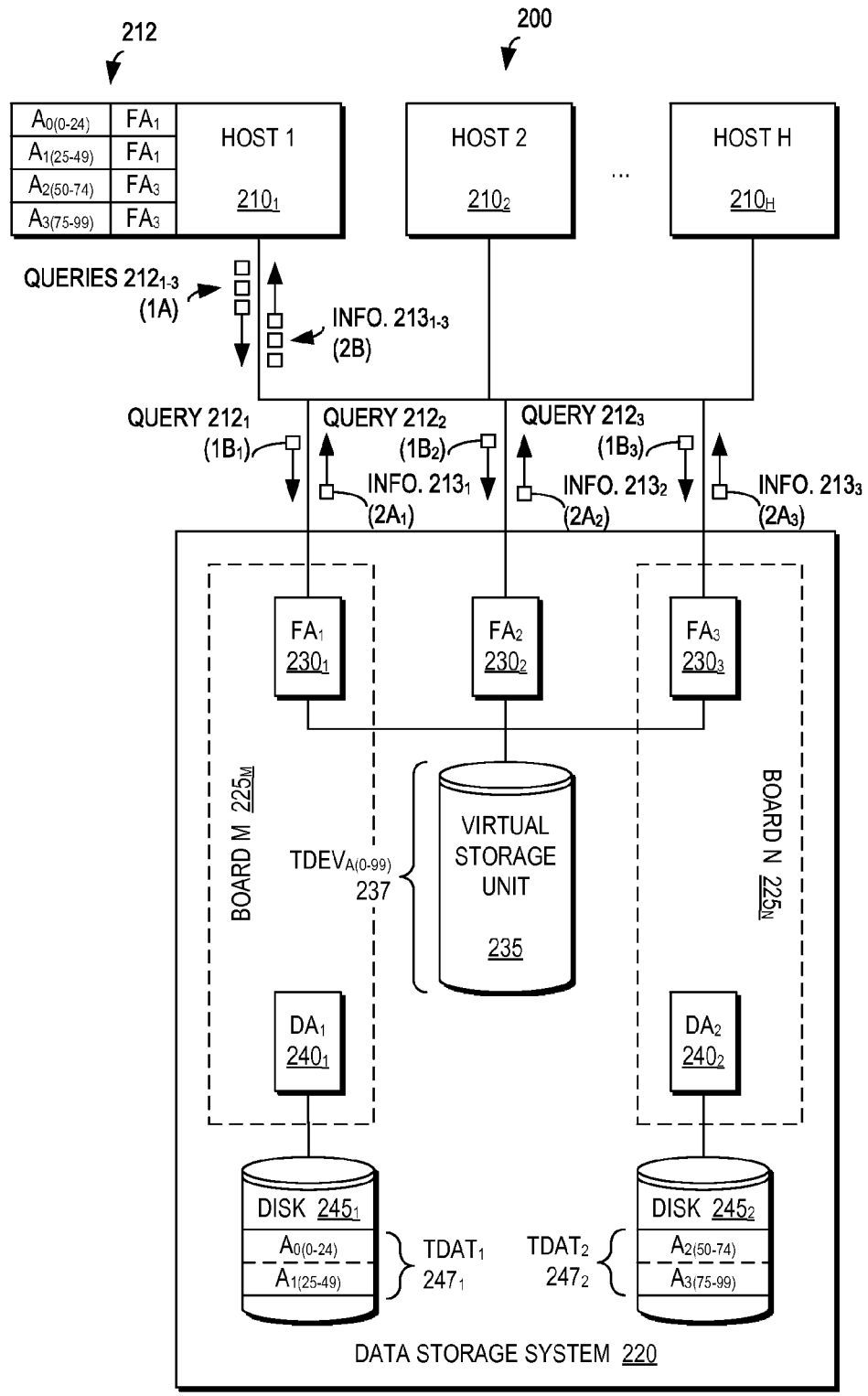
FIG. 2E is a block diagram of the system of FIG. 1 illustrating a host querying ports of a data storage system for updated address ranges of the striped data accessible over the ports to generate an updated mapping of address ranges available over respective ports according to an example embodiment of the present invention.

FIG. 2E is a block diagram of the system 200 of FIG. 1 illustrating a host 210 querying ports 230 of a data storage system 220 for updated address ranges $A_0$-$A_3$ of the striped data $TDAT_1$ $247_1$ and $TDAT_2$ $247_2$ accessible over DAs 240 on the same board 225 as the ports 230 to generate an updated mapping 212 of address ranges $A_0$-$A_3$ available over respective ports 230 according to an example embodiment of the present invention. FIG. 3 is a flow diagram of a method according to an example embodiment of the present invention. FIGS. 1-3 may be described in conjunction below.

As illustrated in FIGS. 2E and 3, the host 210 may determine a preferred path to an address range (e.g., $A_0, A_1, A_2$, and $A_3$) of a virtual storage unit 235 (i.e., $TDEV_A$ 237) striped (i.e., $A_0$ and $A_1$ of $TDAT_1$ $247_1$ and $A_2$ and $A_3$ of $TDAT_2$ $247_2$) across a plurality of disks (e.g., Disks $245_1$ and $245_2$) of a data storage system 220 and send an I/O for data comprising the desired address range over the preferred path.

In certain embodiments, the host 210 may determine a preferred path by querying the data storage system 220 for path and address range information (305). As illustrated in FIGS. 1 and 2E, the query module 180 of Host 1 $210_1$, for example, may (1A) send a plurality of queries $212_{1-3}$ (212 generally), with each query 212 being directed from the multipathing driver 190 to a respective FA 230 (e.g., (1B$_1$) query $212_1$ to $FA_1$ $230_1$, (1B$_2$) query $212_2$ to $FA_2$ $230_2$, and (1B$_3$) query $212_3$ to $FA_3$ $230_3$).

The host 210 then may receive the path and address range information $213_{1-3}$ (213 generally) from the data storage system 220 (310). As illustrated in FIGS. 1 and 2A, each FA 230 may respond to its respective query 212 with path and address range information 213 back to the host $210_1$ (e.g., (2A$_1$) $FA_1$ $230_1$ may respond with information $213_1$, (2A$_2$) $FA_2$ $230_2$ may respond with information $213_2$, and (2A$_3$) $FA_3$ $230_3$ may respond with information $213_3$).

The host $210_1$ may (2B) receive the information $213_{1-3}$ over the multipathing driver 190 and a mapping module 170 may map the path and address range information (315) to determine the preferred path to the address range. The mapping module 170 may store the map 212 to a map store 175. In other words, according to the storage path and address range information 213 received by the host $210_1$, the mapping module 170 may assign respective address ranges of the virtual storage unit 235 to certain FAs 230 of the data storage system 220. As illustrated in FIG. 2E, host $210_1$ creates a map 212 assigning address range $A_{0(0-24)}$ to $FA_1$, address range $A_{1(25-49)}$ to $FA_1$, address range $A_{2(50-74)}$ to $FA_3$, and address range $A_{3(75-99)}$ to $FA_3$ according to the storage path and address range information 214 received from each FA 230.

In other words, based on the queries 212 from the host 210, the data storage system 220 educates the host 210 regarding which address ranges are served by FAs 230 on the same board 225 as the DA 240 accessing the disk 245. In certain embodiments, the queries 212 may be SCSI commands. In certain embodiments, the host 210 may send a single query 212 to the data storage system 220 and the data storage system 220 may respond with the storage path and address range information 213 for all FAs 230.

Figure 2F:
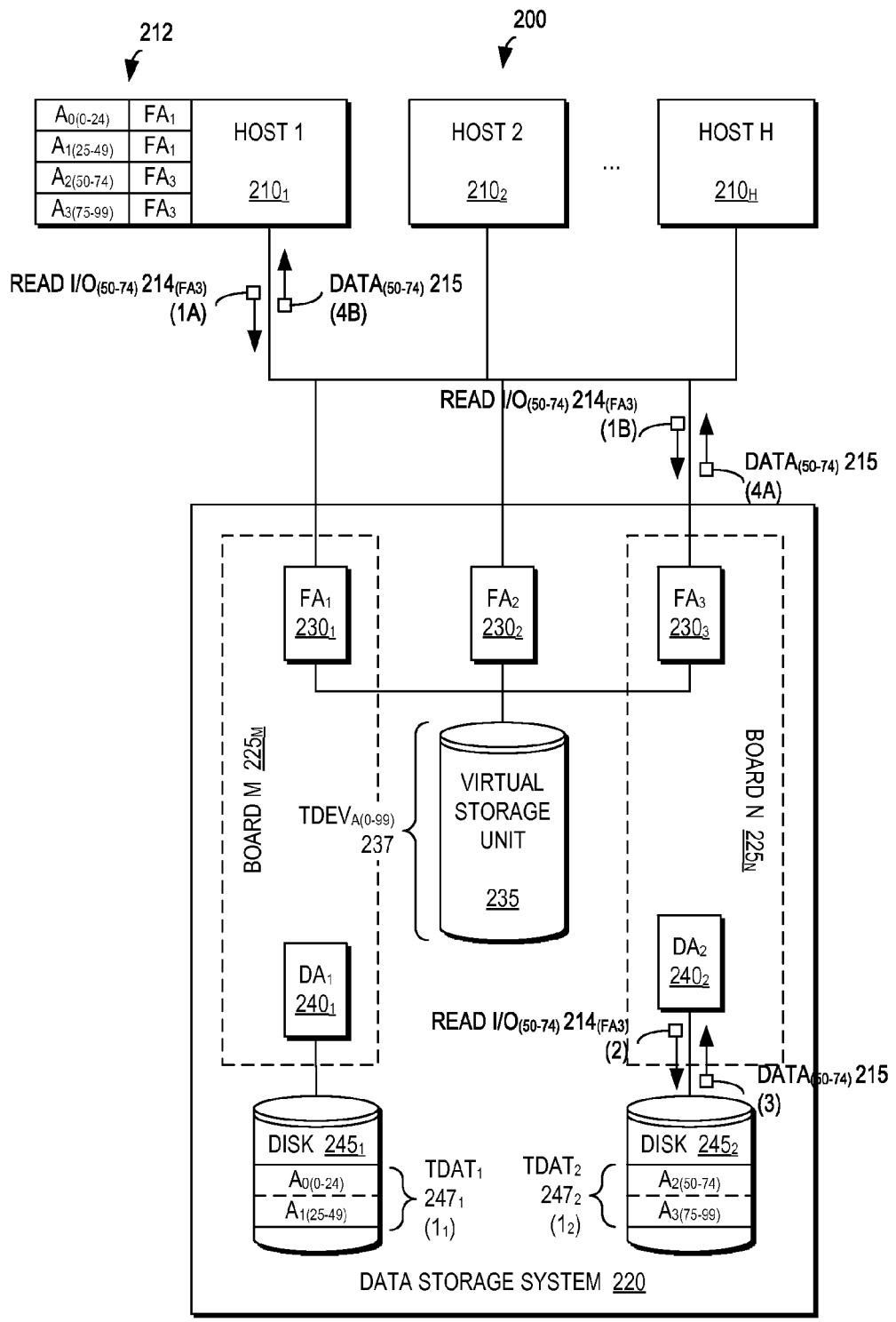
FIG. 2F is a block diagram of the system of FIG. 1 illustrating a host sending a read I/O to a port of a data storage system according to an updated mapping of address ranges available over respective ports and data returned by the data storage system to the host according to an example embodiment of the present invention.

FIG. 2F is a block diagram of the system 200 of FIG. 1 illustrating a host $210_1$ sending a read I/O 214 to a port (e.g., FA3 $230_3$) of a data storage system 220 according to an updated mapping 212 of address ranges (e.g., $A_0, A_1, A_2$, and $A_3$) available over respective ports (e.g., $FA_1$ $230_1$ and $FA_3$ $230_3$) and data 215 returned by the data storage system 220 to the host $210_1$ according to an example embodiment of the present invention. As illustrated in FIG. 2F, the host $210_1$ may receive an I/O request from, for example, an application hosted by the host $210_1$ for data in address range $A_{2(50-74)}$. According to the updated map 212, the host $210_1$ determines that the updated preferred FA 230 of the data storage system 220 to access the requested data in address range $A_2$ is $FA_3$ $230_3$. Therefore, (1) the host $210_1$ directs the read I/O$_{(50-74)}$ $214_{(FA3)}$ to $FA_3$ $230_3$. The data storage system 220 receives the I/O 214 at $FA_3$ $230_3$ and $FA_3$ $230_3$ directs the I/O 214 to $DA_2$ $240_2$ on the same board N $225_N$ as $FA_3$ $230_3$. $DA_2$ $240_2$ then (2) serves the I/O 214 on disk $245_2$ and (3) receives data$_{(50-74)}$ 215 from disk $245_2$ in response to the I/O 214. $DA_2$ $240_2$ directs the data 215 to $FA_3$ $230_3$ on the same board N $225_N$ as $DA_2$ $240_2$. The data storage system 220 then (4) returns the data 215 requested by the I/O 214 from $FA_3$ $230_3$ to the host $210_1$.

The asymmetric logical unit access (ALUA) SCSI standard provides an ability to define a port as providing the best access for a particular SCSI device. However, as described above, example embodiments of the present invention determine the best port for access per chunk rather than per device. In other words, the ALUA standard does not address striping across spindles but rather assumes that only one port is best to access a SCSI device.

Figure 4:
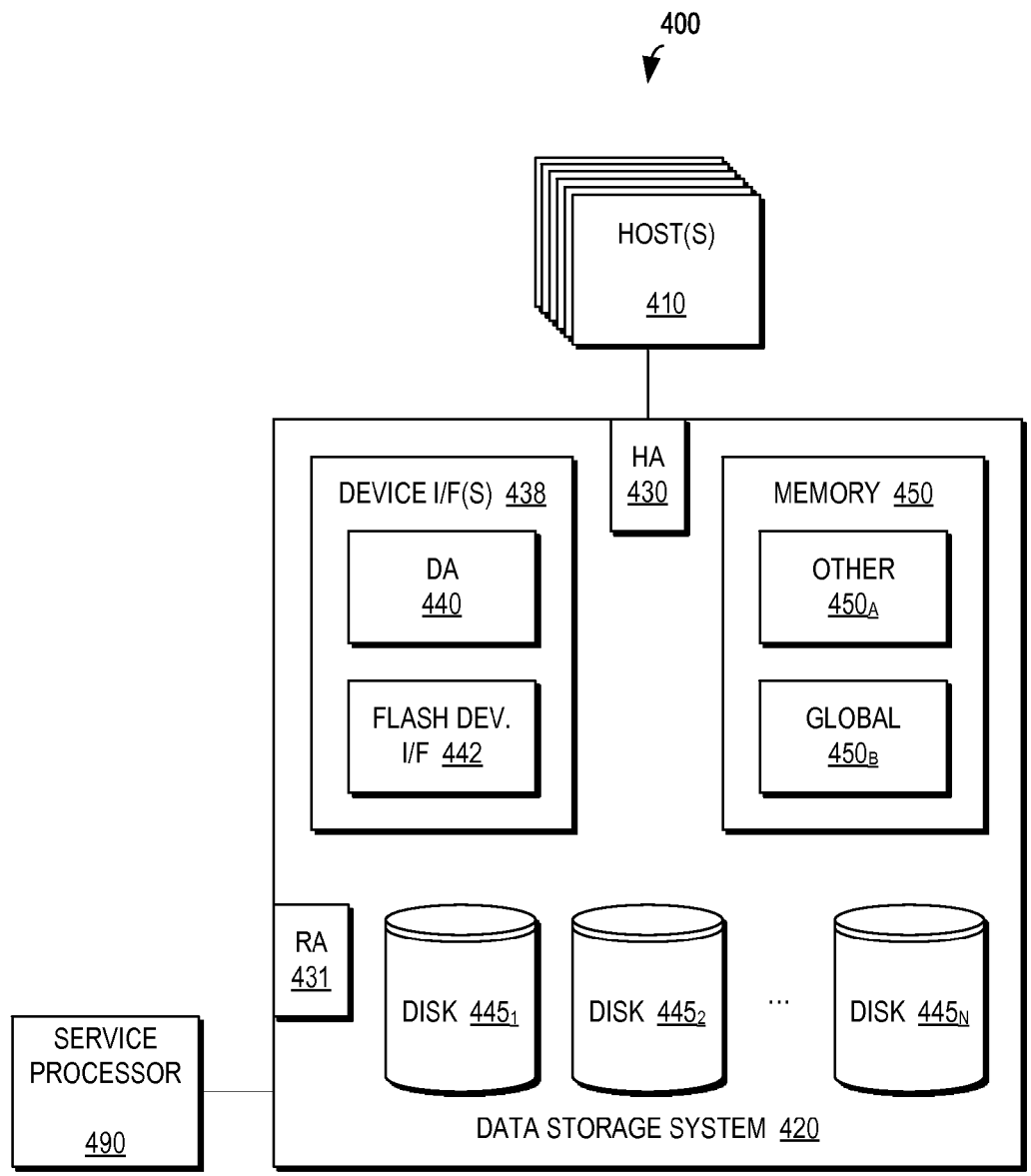
FIG. 4 is a block diagram of the system of FIG. 1 according to an example embodiment of the present invention.

FIG. 4 is a block diagram of the system of FIG. 1 according to an example embodiment of the present invention. As illustrated in FIG. 4, the system 400 includes a data storage system 420 connected to host systems 410 through one or more communication media. In this embodiment of the system 400, the hosts 410 may access the data storage system 420, for example, in performing input/output (I/O) operations or data requests. The one or more communication media may include any of one or more of a variety of networks or other type of communication connections as known to those skilled in the art. The one or more communication media may include any of: a network connection, bus, and/or other type of data link, such as a hardwire or other connections known in the art. For example, the one or more communication media may include any of: the Internet, an intranet, a network (including a Storage Area Network (SAN)) or other wireless or other hardwired connection(s) by which the host systems 410 may access and communicate with the data storage system 420, and may also communicate with other components included in the system 400.

Each of the host systems 410 and the data storage system 420 included in the system 400 may be connected to the one or more communication media by any one of a variety of connections as may be provided and supported in accordance with the type of one or more communication media 4. The processors included in the host computer systems 410 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 420 are described herein in more detail, and may vary with each particular embodiment. Each of the host systems 410 and data storage system 420 may all be located at the same physical site, or, alternatively, may also be located in different physical locations. The one or more communication media that may be used to provide the different types of connections between the host computer systems and the data storage system of the system 400 may use a variety of different communication protocols such as SCSI, Fibre Channel, iSCSI, and the like. Some or all of the connections by which the hosts and data storage system may be connected to the one or more communication media may pass through other communication devices, such switching equipment that may exist such as a phone line, a repeater, a multiplexer or even a satellite. For example, while not shown in FIG. 4., the system 400 may include a switch connected between host system 410 and data storage system 420 such, for example, a Connectrix® switch made available from EMC Corporation of Hopkinton, Mass.

Each of the host computer systems 410 may perform different types of data operations in accordance with different types of tasks. Any one of the host systems 410 may issue a data request to the data storage system 420 to perform a data operation. For example, an application executing on one of the host systems 410 may perform a read or write operation resulting in one or more data requests to the data storage system 420.

It should be noted that although element 420 is illustrated as a single data storage system, such as a single data storage array, element 420 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. Reference may be made to a single data storage array by a vendor, such as by EMC Corporation of Hopkinton, Mass. However, as will be appreciated by those skilled in the art, the techniques herein are applicable for use with other data storage arrays by other vendors and with components other than those described herein for purposes of example.

Components of the data storage system 420 may communicate using GM 25b. For example, in connection with a write operation, an embodiment may first store the data in cache included in a portion of GM 25b, mark the cache slot including the write operation data as write pending (WP), and then later de-stage the WP data from cache to one of the devices $445_1$-$445_N$ ($445$ generally). In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 420 may be a data storage array including a plurality of data storage devices 445 in which one or more of the devices 445 are flash memory devices employing one or more different flash memory technologies. In one embodiment, the data storage system 420 may be a XtremIO™ or Symmetrix® DMX™ or VMAX® data storage array by EMC Corporation of Hopkinton, Mass. In the foregoing data storage array, the data storage devices 445 may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multilevel cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC disk drive, a SATA (Serial Advanced Technology Attachment) drive), and the like. Data protection may specify a type or level of data storage protection such, for example, as a particular RAID level (e.g., RAID1, RAID-5 3+1, RAIDS 7+1, and the like). Performance characteristics may relate to different performance aspects of the physical storage devices of a particular type or technology. For example, there may be multiple types of FC disk drives based on the RPM characteristics of the FC disk drives (e.g., 10 K RPM FC drives and 15 K RPM FC drives) and FC disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. The foregoing are some examples of tier definitions and other tier definitions may be specified in accordance with techniques herein.

The data storage system 420 may be a data storage array including a plurality of data storage devices 445. The data storage devices 445 may include one or more types of data storage devices such as, for example, one or more disk drives and/or one or more solid state drives (SSDs). An SSD is a physical data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although the following paragraphs may make reference to a particular type such as a flash device or flash memory device.

The data storage array may also include different types of adapters or directors, such as an HA 430 (host adapter), RA 431 (remote adapter), and/or device interface 438 (e.g., DA 440 (disk adapter) or flash device interface 442). The term "HA" is used herein interchangeably with the term "FA," and the term "device interface" is used herein interchangeably with the term "BE." Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter or other adapter which facilitates host communication. The HA 430 may be characterized as a front-end component of the data storage system which receives a request from the host. The data storage array may include one or more RAs that may be used, for example, to facilitate communications between data storage arrays. The data storage array may also include one or more device interfaces 438 for facilitating data transfers to/from the data storage devices 445. The data storage interfaces 438 may include device interface modules, for example, one or more disk adapters (DAs) (e.g., disk controllers), adapters used to interface with the flash drives, and the like. The DAs may also be characterized as back-end components of the data storage system which interface with the physical data storage devices.

One or more internal logical communication paths may exist between the device interfaces 438, the RAs 431, the HAs 430, and the memory 450 An embodiment, for example, may use one or more internal busses and/or communication modules. For example, the global memory portion $450_B$ may be used to facilitate data transfers and other communications between the device interfaces, HAs and/or RAs in a data storage array. In one embodiment, the device interfaces 438 may perform data operations using a cache that may be included in the global memory $450_B$, for example, when communicating with other device interfaces and other components of the data storage array. The other portion $450_A$ is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the data storage systems, and the data storage systems also may provide data to the host systems through the channels. The host systems do not address the drives or devices 16a-16n of the data storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical storage device or multiple physical storage devices. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 445. In the following description, data residing on an LV may be accessed by the device interface following a data request in connection with I/O operations that other directors originate. Data may be accessed by LV in which a single device interface manages data requests in connection with the different one or more LVs that may reside on a drive 445. For example, a device interface may be a DA that accomplishes the foregoing by creating job records for the different LVs associated with a particular device. These different job records may be associated with the different LVs in a data structure stored and managed by each device interface.

Also shown in FIG. 4 is a service processor 490 that may be used to manage and monitor the system 420. In one embodiment, the service processor 490 may be used in collecting performance data, for example, regarding the I/O performance in connection with data storage system 420. This performance data may relate to, for example, performance measurements in connection with a data request as may be made from the different host computer systems 410. This performance data may be gathered and stored in a storage area. Additional detail regarding the service processor 490 is described in following paragraphs.

It should be noted that a service processor 490 may exist external to the data storage system 420 and may communicate with the data storage system 420 using any one of a variety of communication connections. In one embodiment, the service processor 490 may communicate with the data storage system 420 through three different connections, a serial port, a parallel port and using a network interface card, for example, with an Ethernet connection. Using the Ethernet connection, for example, a service processor may communicate directly with DAs and HAs within the data storage system 420.

Figure 5:
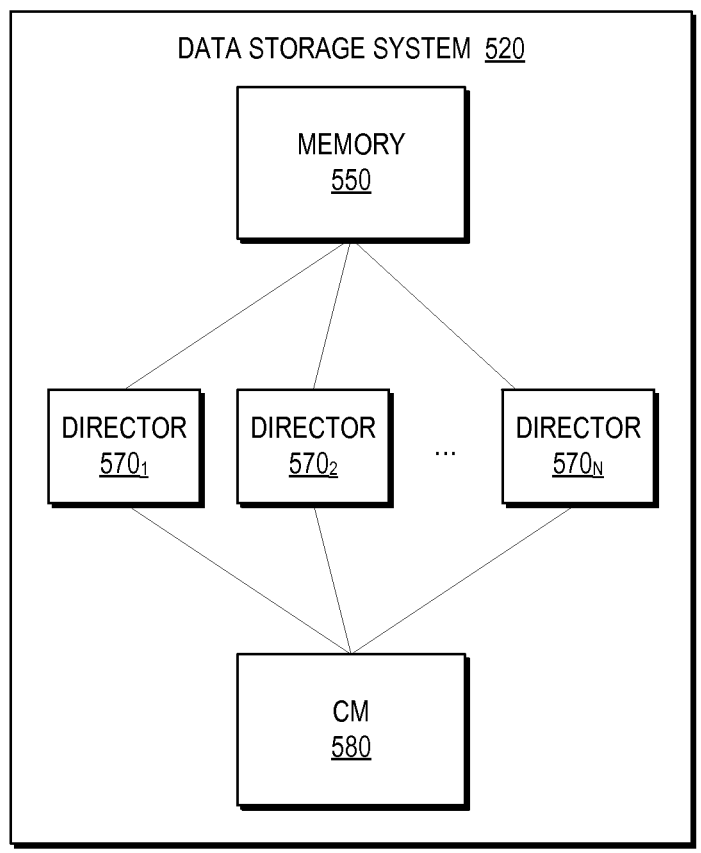
FIG. 5 is a block diagram of logical internal communications between the directors and memory included in an embodiment of a data storage system of FIG. 1A according to an example embodiment of the present invention.

FIG. 5 is a block diagram of logical internal communications between the directors $570_1$-$570_N$ (570 generally) and memory 550 included in an embodiment of a data storage system 520 of FIG. 1 according to an example embodiment of the present invention. As illustrated in FIG. 5 the data storage system 520 includes a plurality of directors 570 coupled to the memory 550. Each of the directors 570 represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with each embodiment.

The data storage system 520 also includes an optional communication module (CM) 580 that provides an alternative communication path between the directors 570. Each of the directors 570 may be coupled to the CM 580 so that any one of the directors 570 may send a message and/or data to any other one of the directors 570 without needing to go through the memory 550. The CM 580 may be implemented using conventional MUX/router technology where a sending one of the directors 570 provides an appropriate address to cause a message and/or data to be received by an intended receiving one of the directors 570. In addition, a sending one of the directors 570 may be able to broadcast a message to all of the other directors 570 at the same time.

Figure 6:
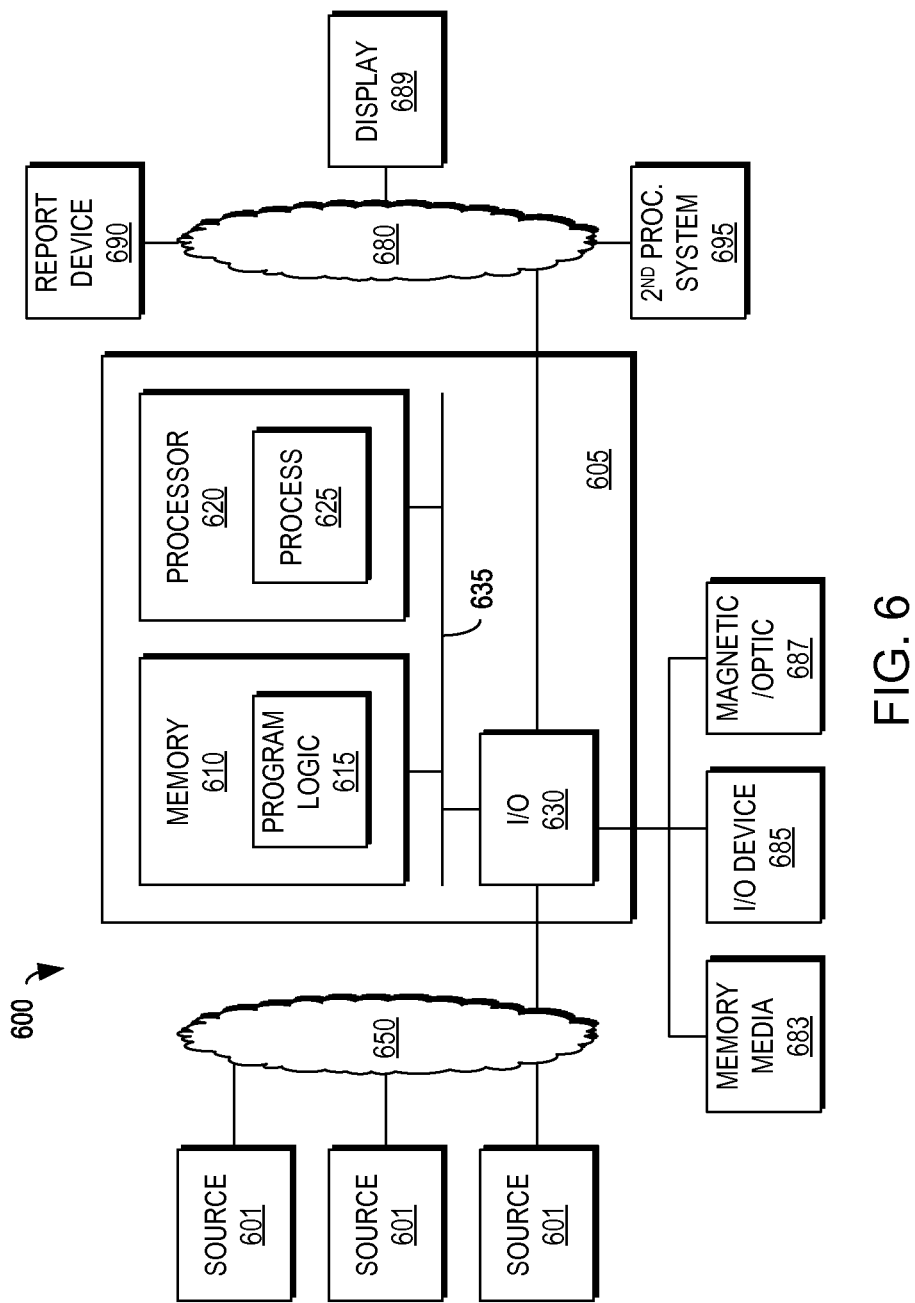
FIG. 6 is a block diagram of an apparatus according to an example embodiment of the present invention.

FIG. 6 is a block diagram of an example embodiment apparatus 605 according to the present invention. The apparatus 605 may be part of a system 600 and includes memory 610 storing program logic 615, a processor 620 for executing a process 625, and a communications I/O interface 630, connected via a bus 635.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 6, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 7:
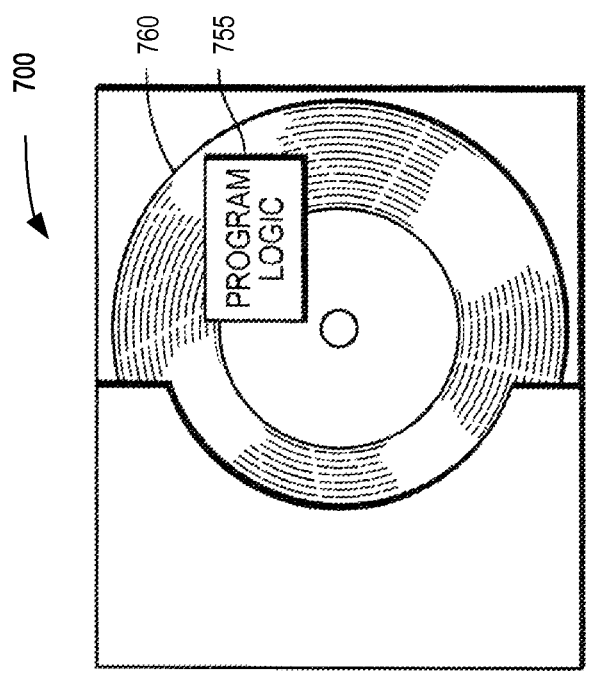
FIG. 7 is a diagram of a computer program product according to an example embodiment of the present invention.

FIG. 7 shows program logic 755 embodied on a computer-readable medium 760 as shown, and wherein the logic 755 is encoded in computer-executable code configured for carrying out the methods of this invention, thereby forming a computer program product 700.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
   determining, at a host communicatively coupled to a data storage system, a preferred path from the host to an address range of a virtual storage unit striped across a plurality of disks of the data storage system; and
   sending an I/O for data comprising the address range from the host over the preferred path to the data storage system.

2. The method of claim 1
   wherein the data storage system comprises a first plurality of front-end adapters configured to be accessed by a host and a second plurality of disk adapters configured to interface with respective ones of the plurality of disks;
   wherein respective ones of the plurality of front-end adapters are associated with respective ones of the plurality of disk adapter; and
   wherein the preferred path is a path from the host to a front-end adapter associated with a disk adapter for a particular disk storing the address range.

3. The method of claim 2 wherein the preferred path minimizes I/O latency attributable to internal communications to process I/Os directed to a particular front-end adapter that is not associated with the disk adapter for the particular disk storing the address range.

4. The method of claim 3 wherein determining a preferred path to an address range of a virtual storage unit striped across a plurality of disks of a data storage system comprises:
   querying the data storage system for path and address range information;
   receiving path and address range information from the data storage system; and
   mapping the path and address range information to determine the preferred path to the address range.

5. The method of claim 4
   wherein querying the data storage system for path and address range information comprises querying the front-end adapter for address ranges stored on disks interfaced by disk adapters associated with the front-end adapter; and
   wherein receiving information relating to the paths and address ranges from the data storage system comprises receiving information relating to the address ranges stored on disk interfaced by disk adapters associated with the front-end adapter.

6. The method of claim 5 wherein querying the front-end adapter for address ranges stored on disks interfaced by disk adapters associated with the front-end adapter comprises sending a SCSI command requesting address range information.

7. The method of claim 5 wherein receiving information relating to the address ranges stored on disk interfaced by disk adapters associated with the front-end adapter comprises receiving a SCSI command comprising address range information.

8. The method of claim 4 wherein the disk on which the address range is stored changes from a first time to a second time after the first time causing the preferred path to be an original preferred path that no longer minimizes I/O latency attributable to internal communications between the plurality of disk adapter, the method further comprising:
   querying the data storage system for updated path and address range information;
   receiving updated path and address range information from the data storage system;
   mapping the updated path and address range information at a third time to determine a preferred path to the address range; and
   sending an I/O for data comprising the address range over the preferred path at a fourth time.

9. The method of claim 8 further comprising receiving the requested data at a fifth time.

10. The method of claim 9
    wherein the fourth time at which the I/O is sent over the preferred path is a time after the second time at which the disk on which the address range is stored changes but before the third time at which the updated path and address range information is mapped such that the mapped path and address range information is not up to date at the fourth time when the I/O is sent,
    wherein sending the I/O for data comprising the address range over the preferred path at a fourth time comprises sending the I/O for data comprising the address range over the original preferred path; and
    wherein receiving the requested data at a fifth time comprises receiving the requested data at the fifth time despite sending the I/O over the original preferred path instead of the updated preferred path according to internal communications between the plurality of disk adapters to process the I/O directed to the particular disk adapter that does not interface with the particular disk storing the address range.

11. An apparatus comprising:
    a processor; and
    memory storing computer executable instructions that, when executed on the processor, causes the apparatus to perform the operations of:
       determining, at a host communicatively coupled to a data storage system, a preferred path from the host to an address range of a virtual storage unit striped across a plurality of disks of the data storage system; and
       sending an I/O for data comprising the address range from the host over the preferred path to the data storage system.

12. The apparatus of claim 11
    wherein the data storage system comprises a first plurality of front-end adapters configured to be accessed by a host and a second plurality of disk adapters configured to interface with respective ones of the plurality of disks;
    wherein respective ones of the plurality of front-end adapters are associated with respective ones of the plurality of disk adapters; and
    wherein the preferred path is a path from the host to a front-end adapters associated with a disk adapter for a particular disk storing the address range.

13. The apparatus of claim 12 wherein the preferred path minimizes I/O latency attributable to internal communications to process I/Os directed to a particular front-end adapter that is not associated with the disk adapter for the particular disk storing the address range.

14. The apparatus of claim 13 wherein determining a preferred path to an address range of a virtual storage unit striped across a plurality of disks of a data storage system comprises:
   querying the data storage system for path and address range information;
   receiving path and address range information from the data storage system; and
   mapping the path and address range information to determine the preferred path to the address range.

15. The apparatus of claim 14
   wherein querying the data storage system for path and address range information comprises querying the front-end adapter for address ranges stored on disks interfaced by disk adapters associated with the front-end adapter; and
   wherein receiving information relating to the paths and address ranges from the data storage system comprises receiving information relating to the address ranges stored on disk interfaced by disk adapters associated with the front-end adapter.

16. The apparatus of claim 15 wherein querying the front-end adapter for address ranges stored on disks interfaced by disk adapters associated with the front-end adapter comprises sending a SCSI command requesting address range information.

17. The apparatus of claim 15 wherein receiving information relating to the address ranges stored on disk interfaced by disk adapters associated with the front-end adapter comprises receiving a SCSI command comprising address range information.

18. The apparatus of claim 14 wherein the disk on which the address range is stored changes from a first time to a second time after the first time causing the preferred path to be an original preferred path that no longer minimizes I/O latency attributable to internal communications between the plurality of disk adapter, the method further comprising:
   querying the data storage system for updated path and address range information;
   receiving updated path and address range information from the data storage system;
   mapping the updated path and address range information at a third time to determine a preferred path to the address range; and
   sending an I/O for data comprising the address range over the preferred path at a fourth time.

19. The apparatus of claim 18 further comprising receiving the requested data at a fifth time.

20. The apparatus of claim 19
   wherein the fourth time at which the I/O is sent over the preferred path is a time after the second time at which the disk on which the address range is stored changes but before the third time at which the updated path and address range information is mapped such that the mapped path and address range information is not up to date at the fourth time when the I/O is sent,
   wherein sending the I/O for data comprising the address range over the preferred path at a fourth time comprises sending the I/O for data comprising the address range over the original preferred path; and
   wherein receiving the requested data at a fifth time comprises receiving the requested data at the fifth time despite sending the I/O over the original preferred path instead of the updated preferred path according to internal communications between the plurality of disk adapters to process the I/O directed to the particular disk adapter that does not interface with the particular disk storing the address range.

21. A computer program product including a computer readable storage medium having computer program code encoded thereon that, when executed on a processor of a computer, causes the computer to send an I/O over a preferred path, the computer program code comprising:
   computer program code for determining, at a host communicatively coupled to a data storage system, a preferred path from the host to an address range of a virtual storage unit striped across a plurality of disks of the data storage system; and
   computer program code for sending an I/O for data comprising the address range from the host over the preferred path to the data storage system.

* * * * *